(12) United States Patent
Winfield

(10) Patent No.: US 10,144,246 B2
(45) Date of Patent: Dec. 4, 2018

(54) CONVERTIBLE BACKPACK

(71) Applicants: Menachem Pinhas Winfield, Katzir (IL); STARRY LIMITED, Quarry Bay, Hong Kong (CN)

(72) Inventor: Menachem Pinhas Winfield, Katzir (IL)

(*) Notice: Subject to any disclaimer, the term of this patent is extended or adjusted under 35 U.S.C. 154(b) by 0 days.

(21) Appl. No.: 15/886,898

(22) Filed: Feb. 2, 2018

(65) Prior Publication Data
US 2018/0215198 A1     Aug. 2, 2018

(51) Int. Cl.
| | |
|---|---|
| *A45C 5/14* | (2006.01) |
| *B60B 7/20* | (2006.01) |
| *A45C 7/00* | (2006.01) |
| *A45F 3/04* | (2006.01) |
| *A45C 13/26* | (2006.01) |

(52) U.S. Cl.
CPC ............ *B60B 7/20* (2013.01); *A45C 5/14* (2013.01); *A45C 7/0086* (2013.01); *A45F 3/04* (2013.01); *A45C 2013/267* (2013.01)

(58) Field of Classification Search
CPC ......... A45C 5/14; A45C 5/146; A45C 13/262; A45C 13/385; A45C 2005/148; A45C 7/0086; A45C 2013/267; A45F 3/04; B60B 7/20
See application file for complete search history.

(56) References Cited

U.S. PATENT DOCUMENTS

| | | | | |
|---|---|---|---|---|
| 5,544,910 A * | 8/1996 | Esposito | ................. | B62B 1/12 280/47.29 |
| 5,984,154 A * | 11/1999 | Scicluna | ................. | A45F 3/04 190/18 A |
| 6,289,554 B1 * | 9/2001 | Wang | ................. | A45C 5/146 16/18 B |
| 6,367,602 B1 * | 4/2002 | Chang | ................. | A45C 5/146 190/18 A |
| 6,507,975 B2 * | 1/2003 | Maupin | ............... | B60B 33/0005 16/19 |
| 6,612,411 B2 * | 9/2003 | Nykoluk | ................. | A45C 5/146 190/115 |
| 7,036,641 B2 * | 5/2006 | Russo | ................. | A45C 5/143 190/115 |
| 7,617,956 B1 * | 11/2009 | Sabbah | ................. | A45C 5/143 190/18 A |
| 7,984,797 B1 * | 7/2011 | Bieber | ................. | A45C 13/36 190/122 |
| 8,757,643 B2 * | 6/2014 | Arthur | ................. | A45C 5/146 16/34 |
| 2004/0000457 A1 * | 1/2004 | Sanford-Schwentke | | A45C 5/146 190/18 A |
| 2004/0188201 A1 * | 9/2004 | Chuo | ................. | A45C 5/14 190/18 A |

(Continued)

*Primary Examiner* — Corey Skurdal
(74) *Attorney, Agent, or Firm* — Maxwell L. Minch; GrayRobinson, P.A.

(57) ABSTRACT

This invention is related to a convertible backpack capable of being converted from a regular backpack into a trolley case and vice versa according to a user preference. The convertible backpack of the invention comprises at least a rotatable wheels cover mechanism, for covering the outer side of each one of the wheels upon usage of the convertible backpack as a backpack and for uncovering the outer side of each one of the wheels upon usage of the convertible backpack as a trolley case.

5 Claims, 6 Drawing Sheets

(56) References Cited

U.S. PATENT DOCUMENTS

| | | | |
|---|---|---|---|
| 2005/0178630 A1* | 8/2005 | Wu | A45C 5/146 190/18 A |
| 2006/0207848 A1* | 9/2006 | Sher | A45C 5/14 190/18 A |
| 2008/0135366 A1* | 6/2008 | Katz | A45C 5/14 190/18 A |
| 2012/0261223 A1* | 10/2012 | Pattni | A45C 5/14 190/18 A |

* cited by examiner

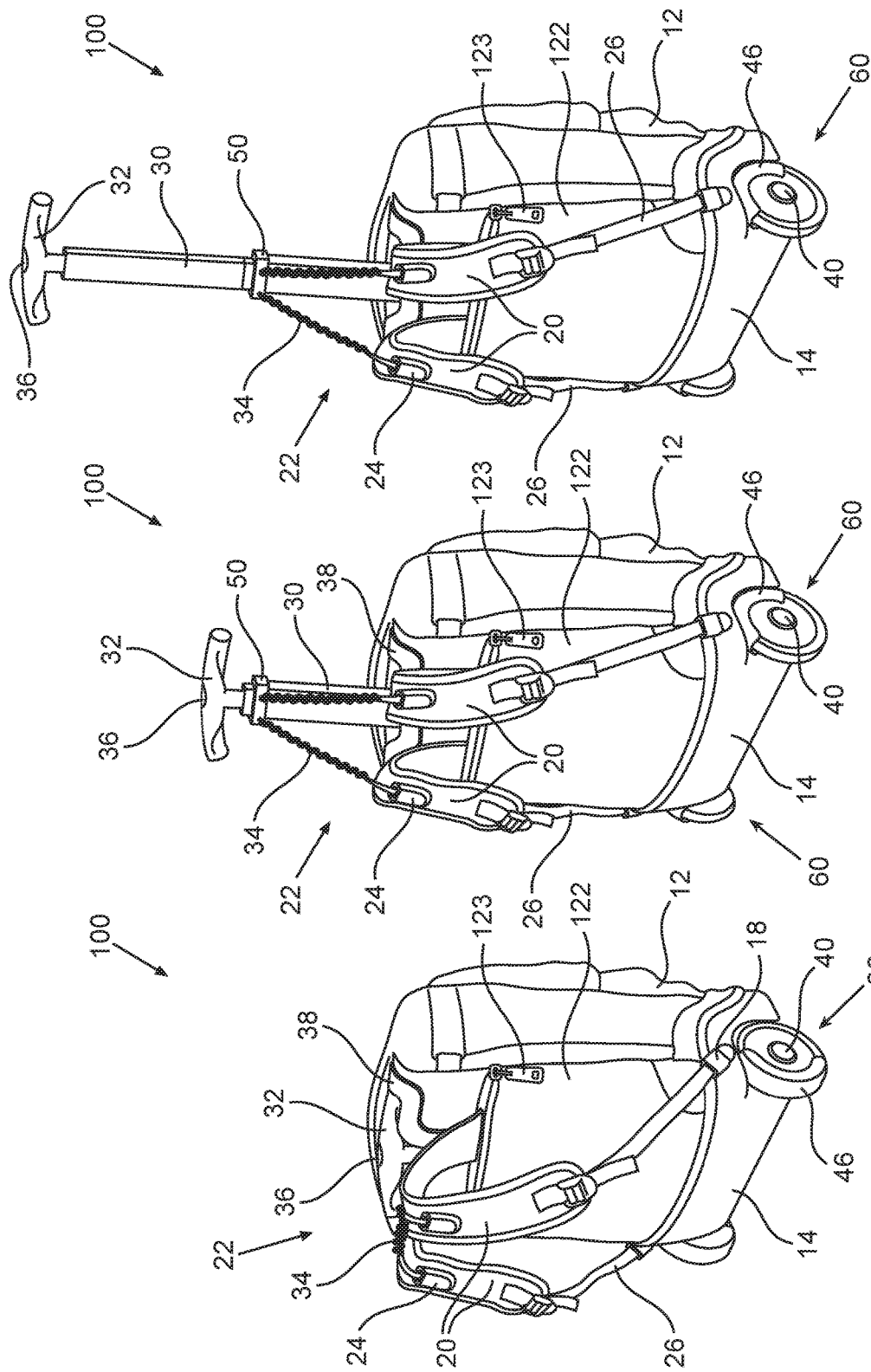

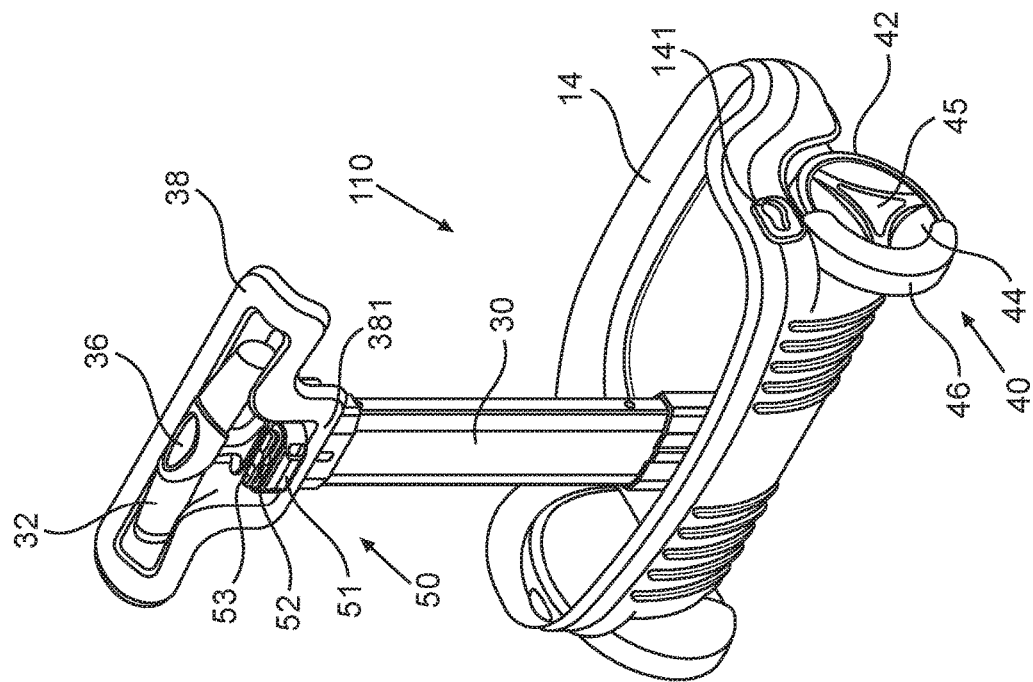
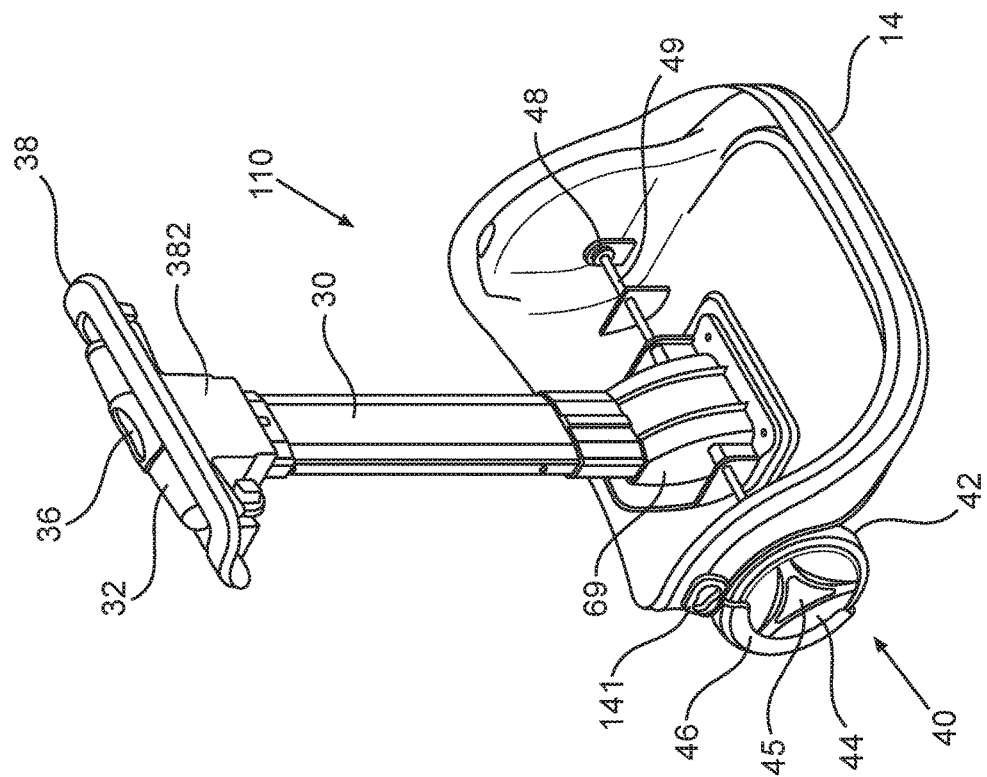

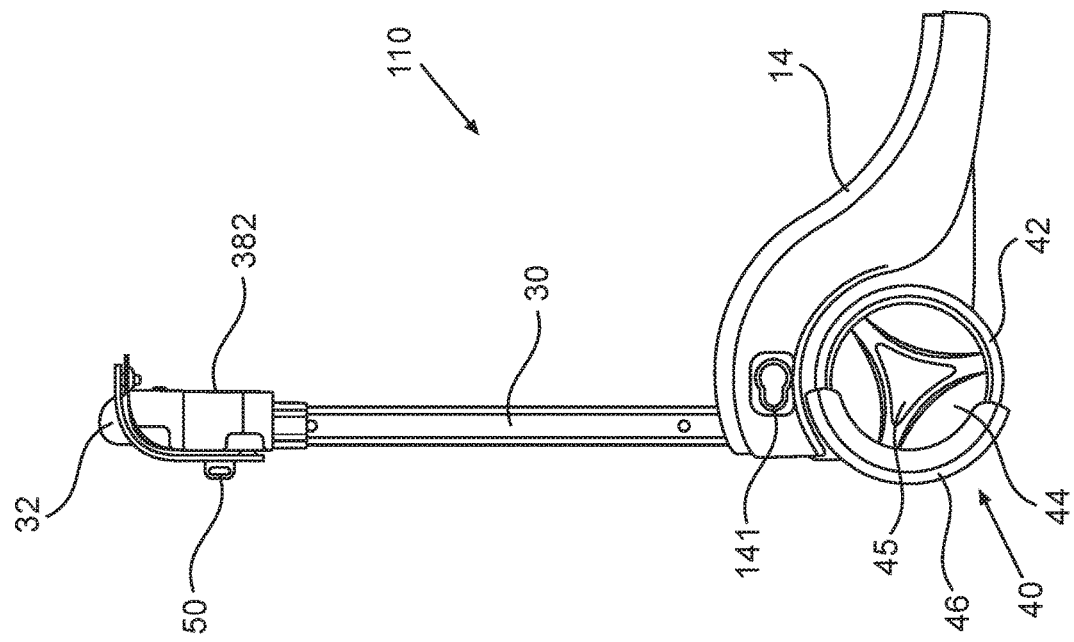
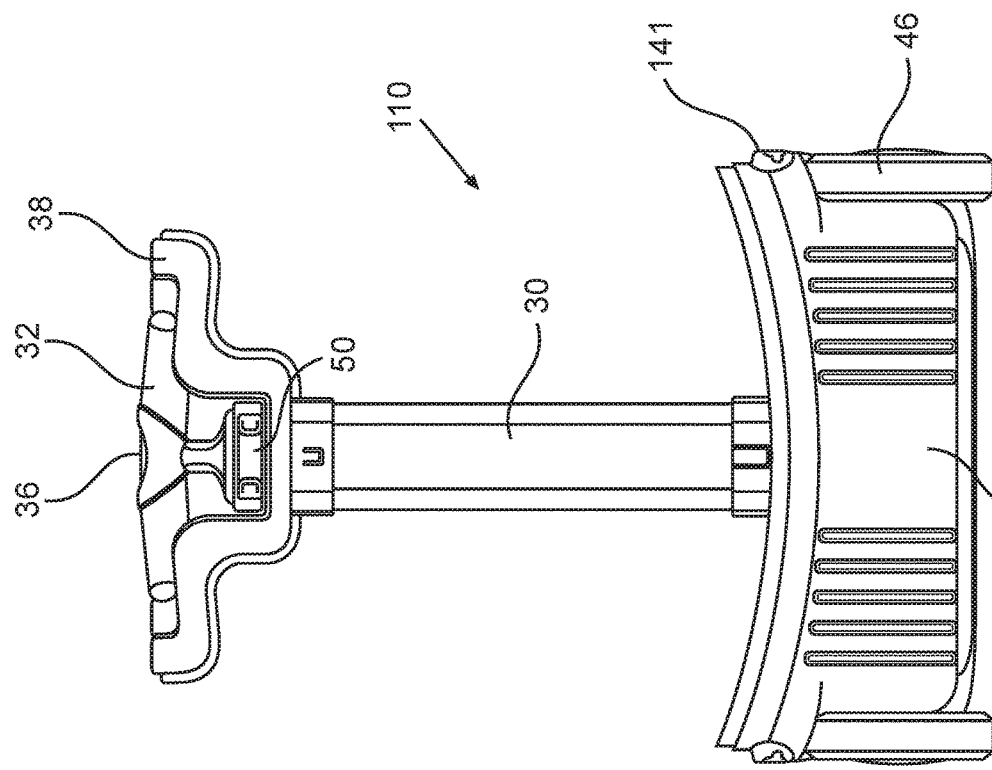

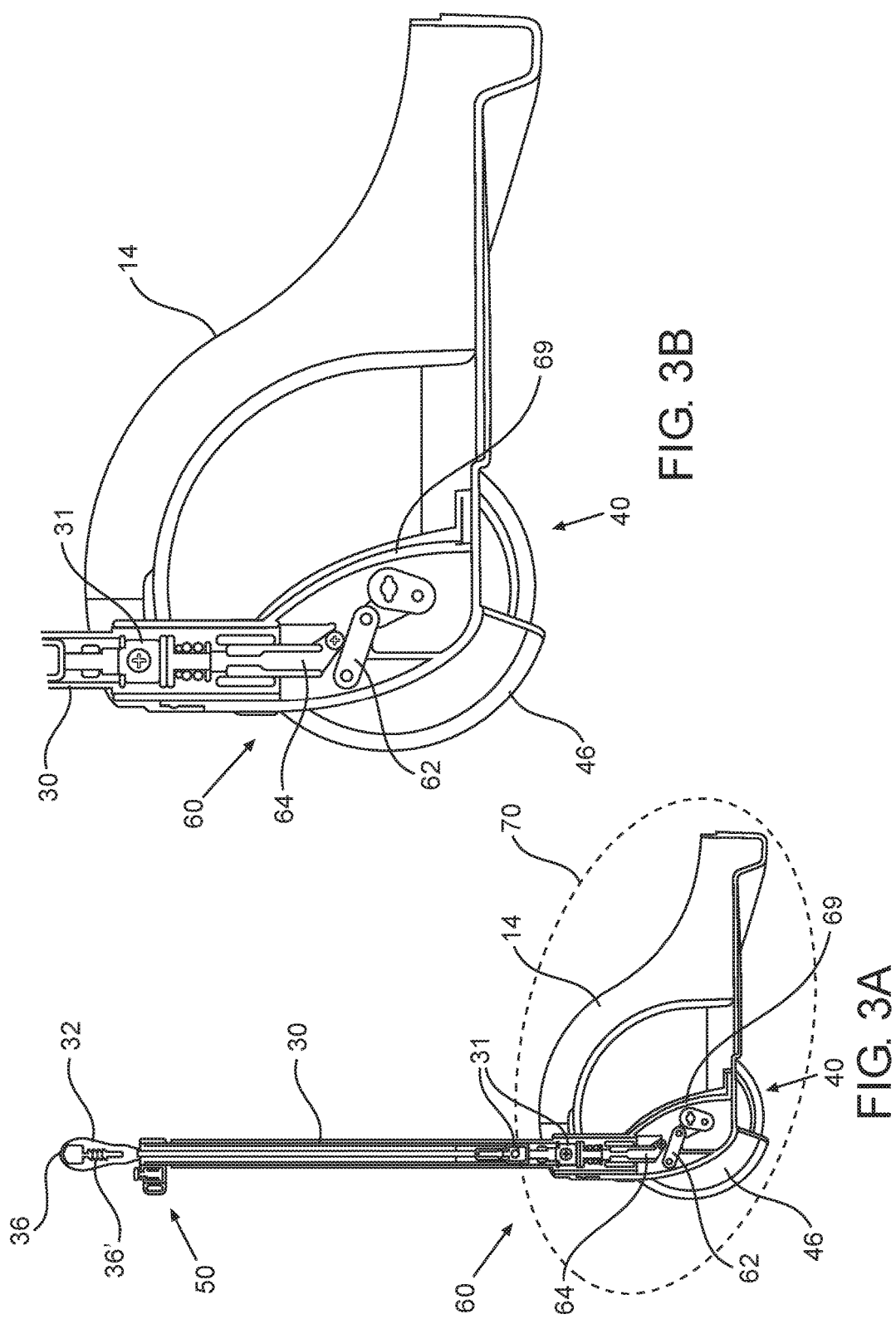

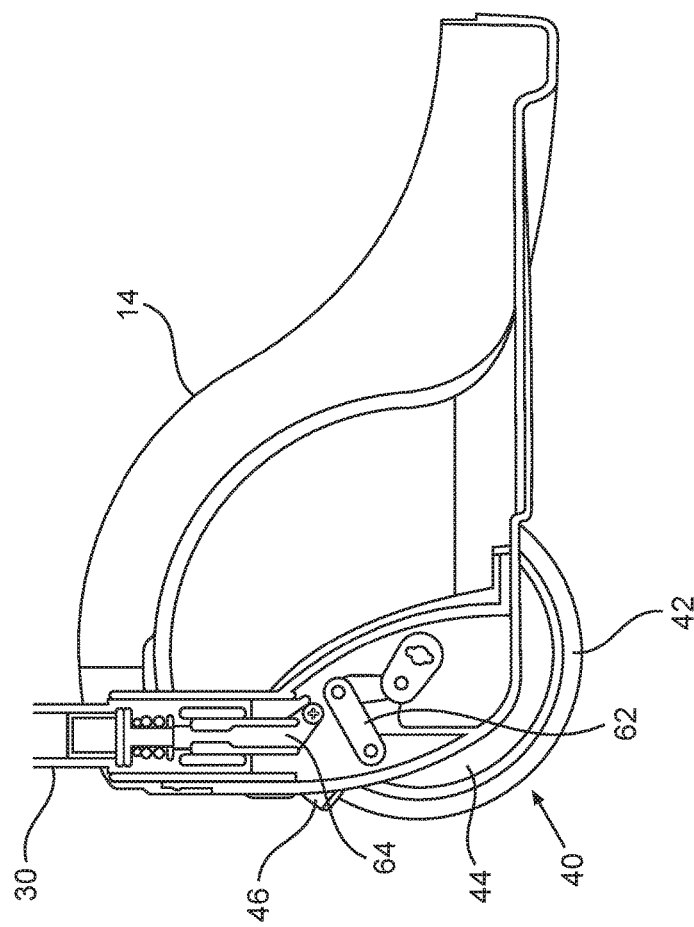
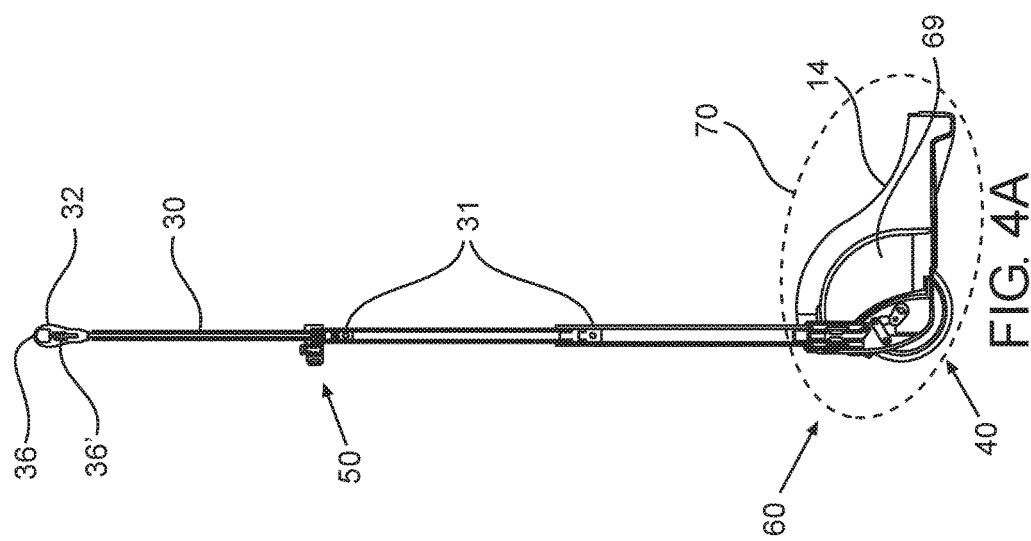
FIG. 4B
FIG. 4A

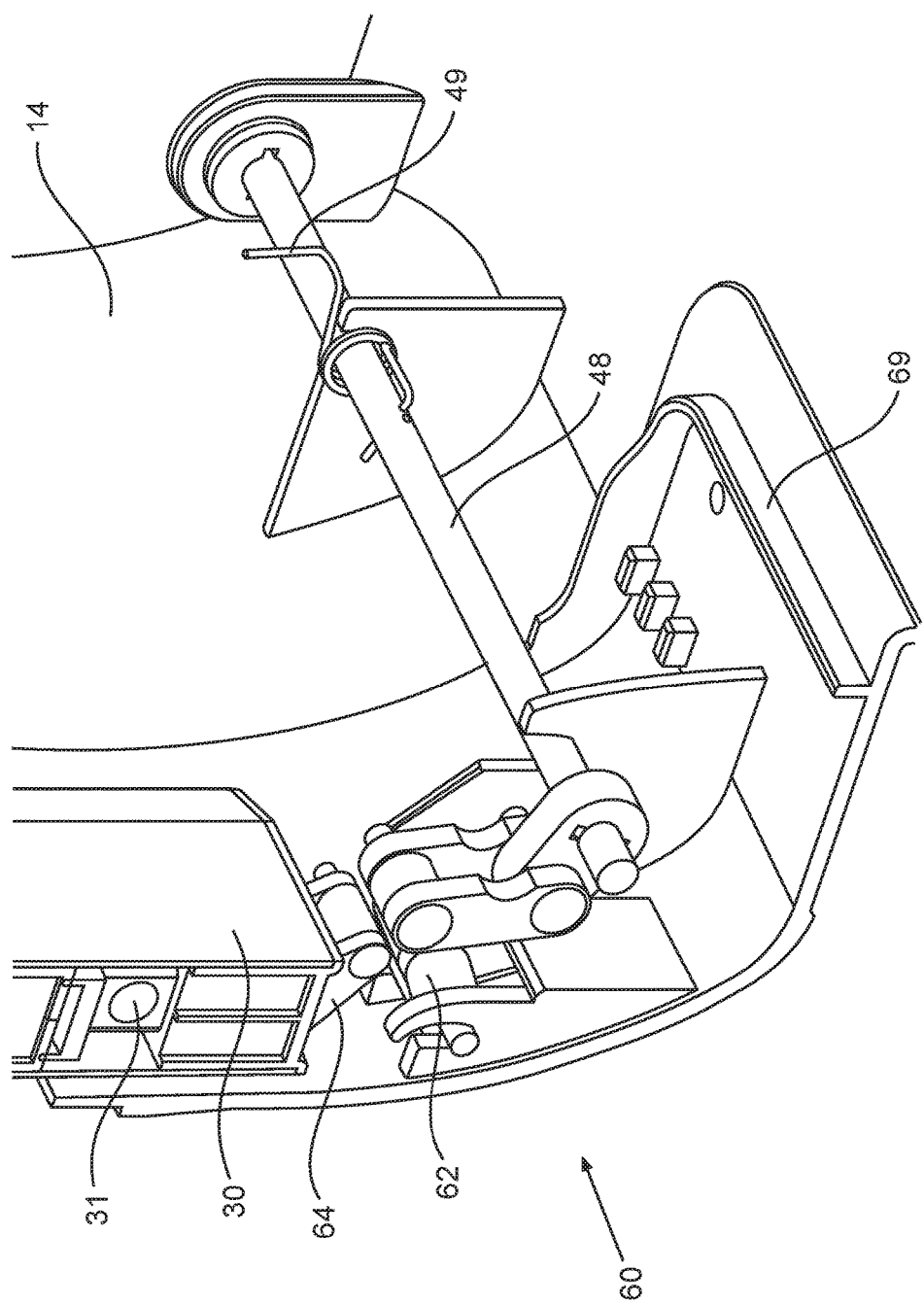

CONVERTIBLE BACKPACK

CROSS-REFERENCE TO RELATED APPLICATION

This claims priority from the foreign filed Application No. 250430, filed with the State of Israel Patent Office on Feb. 2, 2017, the contents of which are incorporated by reference herein in its entirety.

TECHNOLOGICAL FIELD AND BACKGROUND

The present invention is in the field of convertible backpacks that can be modified to trolley cases. More specifically, this invention relates to a novel backpack with a wheels' cover mechanism that allows adjustment of the backpack to the usage mode, for keeping it clean and whole and also for protecting the user's garment while carrying it on the back after rolling it on the ground.

Convertible backpacks that may also be used as trolley cases are well known in the art. The rationale beyond such products is to provide the user with the option to choose between carrying the backpack on his/her back, or rolling it on the ground according to the users' preferences at a specific time point, for example; according to the weight the user should carry with the backpack, the route to pass, the weather conditions, the user health condition, and the like.

Such convertible backpacks can be found for children and adults. Most backpacks, if not all, suffer from two main drawbacks: the first related to the shoulder straps and the other relates to the wheels.

When the backpack is used as a trolley case, the shoulder straps usually end up being dragged on the ground, get dirty and dusty and frayed. As a result, the backpack appears worn out and furthermore, unpleasant to be used when carried on the back. Some convertible products available in the market contains loops and hooks to lift the straps up from the ground Another drawback of convertible backpacks is related to the wheels. When the user is carrying the backpack on his/her back, the wheels may carry dirt from the ground and get the garments that the user is wearing dirty. This can damage the garments, as some stains are hard to remove and may also cause the user to appear sloppy and not decent. Furthermore, when it is raining, upon carrying the bag on the back after using it as a trolley, the user's clothing may get wet and make the user uncomfortable.

To overcome this problem, some wheel covers were developed and are known in the art, however, those wheel covers have cumbersome mechanisms, and as such are very expensive. Some examples for wheel covers are described in US 2006/207848, U.S. Pat. Nos. 6,179,176, 5,749,503, and U.S. Pat. No. 5,984,154.

The present invention is aimed to provide a solution to the wheels problem described above by suggesting simple and effective mechanism that is friendly and intuitive to the user as will be described in details herein below.

SUMMARY OF THE INVENTION

In one aspect of the invention, a convertible backpack configured to be converted from a backpack position into a trolley case, and vice versa according to a user preference is provided. The convertible backpack comprises at least: a trolley base configured to hold a backpack and to be connected to a handle and to at least two wheels for rolling the trolley case on the ground; a telescopic trolley handle configured to be extracted upward upon usage of the convertible backpack as a trolley case, and to be retracted inward upon usage as a backpack; at least two wheels configured to allow rolling of the trolley case on the ground; a backpack body configured to be assembled with said trolley base and said telescopic trolley handle; and optionally a shoulder straps retraction mechanism; wherein, upon extraction of said telescopic trolley handle upward for usage of said convertible backpack as a trolley case, the shoulder straps retraction mechanism pulls the shoulder straps upward along said telescopic trolley handle, for elevating said shoulder straps away from the ground, and further to bring the shoulder straps back to their initial position, upon retraction of said telescopic trolley handle inward to a backpack position.

In accordance with one main aspect of the invention, the convertible backpack comprises rotatable wheels cover mechanism for covering the outer side of each one of said wheels upon usage of said convertible backpack as a backpack and for uncovering the outer side of each one of said wheels upon usage of said convertible backpack as a trolley case. The rotatable wheels cover mechanism is preferably operated by movement of the telescopic trolley handle upward and downward such that upon extraction of said telescopic trolley handle upward, each of said wheel covers rotate inward so as to uncover the outer side of said wheels, and upon insertion of said telescopic trolley handle downward, each of said wheel covers rotate outward so as to cover the outer side of said wheels. Optionally, the rotatable wheels cover mechanism comprises at least: a crankshaft top pressure slider positioned at the lowest part of said telescopic trolley handle; a crank; a wheel shaft for connecting said wheels of said convertible backpack; and at least two retraction springs mounted on said wheel shaft; wherein, upon insertion of the telescopic trolley handle downward, each of said wheel covers is rotated by said wheel shaft outward by pressure produced by said crankshaft top pressure slider on said crank so as to cover said outer sides of the wheels, and upon extraction of the telescopic trolley handle upward, said crankshaft top pressure slider is pulled up, releasing the pressure on said crank, thereby allowing the wheel shaft to rotate inward with the aid of the force applied by said at least two retraction springs together with said wheel covers so as to uncover the outer sides of said wheels.

The convertible backpack may further comprise shoulder straps and a shoulder straps retraction mechanism, wherein upon extraction of the telescopic trolley handle upward for usage of said convertible backpack as a trolley case, said shoulder straps retraction mechanism is configured to pull the shoulder straps upward along said telescopic trolley handle, for elevating said shoulder straps away from the ground, and further to bring said shoulder straps back to their initial position, upon retraction of said telescopic trolley handle inward to a backpack position.

In a further aspect of the invention, a rotatable wheels cover mechanism for a convertible backpack that can be converted from a backpack into a trolley case, and vice versa, according to a user's preference is provided. The rotatable wheels cover mechanism comprises at least: a crankshaft top pressure slider positioned at the lowest part of a telescopic trolley handle; a crank; a wheel shaft for connecting the wheels of said convertible backpack; wheel covers for covering the wheels of said convertible backpack, and at least two retraction springs mounted on said wheel shaft; wherein, upon usage of the convertible backpack as a backpack and insertion of the telescopic trolley handle downward, each of said wheels covers is rotated by said wheel shaft outward by pressure produced by said crankshaft top pressure slider on said crank, so as to cover the outer sides of said wheels, and upon extraction of said telescopic trolley handle upward to use said convertible backpack as a trolley case, said crankshaft top pressure slider is pulled up, and the pressure on said crank is released, allowing said wheel shaft, with the aid of the force applied by said at least two retraction springs, to rotate inward, together with said wheels covers, so as to uncover the outer sides of said wheels.

BRIEF DESCRIPTION OF THE DRAWINGS

Examples illustrative of variations of the disclosure are described below with reference to figures attached hereto. In the figures, identical structures, elements or parts that appear in more than one figure are generally labeled with the same numeral in all the figures in which they appear. Dimensions of components and features shown in the figures are generally chosen for convenience and clarity of presentation and are not necessarily shown to scale. The figures presented are in the form of schematic illustrations and, as such, certain elements may be drawn greatly simplified or not-to-scale, for illustrative clarity. The figures are not intended to be production drawings.

The figures (Figs.) are listed below.

FIGS. 1A-1C are schematic illustrations of a convertible backpack having a shoulder straps retraction mechanism and wheels cover mechanism according to examples of the invention; the backpack is illustrated in a backpack form (FIG. 1A), an intermediate form between a backpack and a trolley case (FIG. 1B), and a trolley case (FIG. 1C);

FIGS. 2A-2D are schematic illustration of the convertible backpack of FIG. 1A, showing the skeletal components of the convertible backpack (the trolley frame without the fabric), showing the major components of the shoulder straps retraction mechanism and of the wheels cover mechanism in a backpack form; FIG. 2A is an isometric front view of the convertible backpack frame; FIG. 2B is an isometric back view of the convertible backpack frame; FIG. 2C is a back view of the convertible backpack frame; and FIG. 2D is a side view of the convertible backpack frame.

FIG. 3A is a schematic cross section side view illustration of the convertible backpack frame of FIG. 2D, showing the structure and position of the components involved in the rotatable cover wheel mechanism when the telescopic handle is closed;

FIG. 3B is a close-up view on the wheel crankshaft mechanism shown in FIG. 3A.

FIG. 4A is a schematic cross section side view illustration of the convertible backpack frame of FIG. 2D, showing the structure and position of the components involved in the rotatable cover wheel mechanism when the telescopic handle is open (trolley form);

FIG. 4B is a close-up view on the wheel crankshaft mechanism shown in FIG. 4A.

FIG. 4C is an isometric close-up view on the wheel crankshaft mechanism shown in FIG. 4B.

DETAILED DESCRIPTION OF EMBODIMENTS

Although various features of the disclosure may be described in the context of a single embodiment, the features may also be provided separately or in any suitable combination. Conversely, although the disclosure may be described herein in the context of separate embodiments for clarity, the disclosure may also be implemented in a single embodiment. Furthermore, the disclosure can be carried out or practiced in various ways, and that the disclosure can be implemented in embodiments other than the exemplary ones described herein below. The descriptions, examples and materials presented in the description, as well as in the claims, should not be construed as limiting, but rather as illustrative.

FIGS. 1A-1C are general views of a convertible backpack 100 configured to be transformed from a backpack to a trolley case according to the user's preference at a specific time point. Convertible backpack 100 comprises a novel rotatable wheels' cover mechanism 60 for covering wheels 40 by a cover 46, when carrying the backpack on the back for aesthetic and hygienic reasons and, uncovering the wheels when the backpack is being used as a trolley case.

In the specific example illustrated herein, convertible backpack 100 further comprises a shoulder straps retraction mechanism 22 for keeping the shoulder straps 20 away from the ground when they are not in use, by stretching them onto the telescopic trolley handle 30, such that the shoulder straps will not interfere when rolling the trolley case on the floor. This keeps the shoulder straps clean and undamaged, preventing the shoulder straps from becoming worn out quickly. Convertible backpack 100 also comprises a novel wheels' cover mechanism for covering wheels 40 by a cover 46, when carrying the backpack on the back for aesthetic and hygienic reasons and, uncovering the wheels when the backpack is being used as a trolley case.

As shown in these figures, convertible backpack 100 comprises a backpack body 12 preferably made of a fabric, assembled onto a trolley case base 14 connected to a telescopic handle 30 and to a handle grip cradle 38. The telescopic handle comprises a grip 32 that contains a release button 36, for releasing handle 30 when using the convertible backpack as a trolley case. In the specific example illustrated in these figure, trolley case base 14 is connected to two wheels 40, each wheel having a rotatable cover 46. When convertible backpack 100 is being transformed from a backpack form (FIG. 1A) to an intermediate form (FIG. 1B) and to a trolley case form (FIG. 1C), telescopic handle 30 is pulled upward and pulls with it an elastic webbing strap 34 that is connected to each one of shoulder straps 20 by connector 24 and threaded through a dedicated top anchoring assembly 50 that is mounted on telescopic handle 30, in a manner such that when pulling telescopic handle 30 upward for using the convertible backpack as a trolley case, elastic webbing strap 34 is pulled upward together with telescopic handle 30 and pulls with it two shoulder straps 20. The elastic webbing strap is preferably, but not necessarily, a zigzag webbing. When pushing telescopic handle 30 downward to transform the trolley case back to a backpack form, the elastic webbing strap is retracted back to its non-stretched state (loose state) as shown in FIG. 1A and the shoulder straps return to their loose form of a backpack position. Elastic webbing strap 34 may be attached to top anchoring assembly 50 by various means that are different from the non-limiting example illustrated in these figures. In addition, the shoulder straps may be connected each to a different, separated elastic webbing strap, wherein each elastic webbing strap is further connected to top anchoring assembly 50 in a manner such that upon extraction of the telescopic trolley handle 30 upward each elastic webbing strap is stretched and pulls up with it the specific shoulder strap that it being connected to. Alternatively, both shoulder straps may be connected to the same elastic webbing strap, each shoulder strap to one of its ends, in which case the elastic webbing strap is further attached to a top anchoring assembly 50 mounted on telescopic handle 30.

Additionally, when telescopic handle 30 is being pushed downward to its minimal size (backpack position), each of the wheels' cover 46 is rotated (by a wheel shaft) fully outward, as shown in FIG. 1A. Once the telescopic handle 30 is pulled upward to an open position (FIGS. 1B, 1C), each of the wheel covers 46 is retracted (by internal springs) and rotated by the wheel shaft back into the trolley base 14 to allow rolling of the trolley case on the ground. Detailed description of the components involved in the rotatable wheel's cover mechanism described above will be provided with reference to FIGS. 2-4 hereinbelow.

FIGS. 2A-2D are schematic illustration of the frame 110 of convertible backpack 100 of FIG. 1A, showing the structural components of the backpack (without the fabric) and the major components of the shoulder straps retraction mechanism 22 and the wheels' cover mechanism 60.

FIGS. 2A and 2B are isometric front views and back views, respectively, of convertible backpack frame 110 in a backpack form, showing the trolley base 14 connected to two wheels 40, each wheel composed of a wheel tire 42, wheel core 44, and optionally, but not necessarily, a wheel shaft cover 45. In some embodiments, the shaft cover can be an integral part of the wheel core. In some other embodiments, different wheels having another structure other than the one described above may be used. Each wheel is further connected to a rotatable cover 46, configured to rotate outward and inward relative to trolley base 14 so as to fit to the state of telescopic handle 30, such that when the telescopic handle 30 is fully open (trolley case form) each of the wheels cover 46 is rotated inward into the trolley base to uncover the wheels, so as to allow rolling of the trolley case on the ground; when telescopic handle 30 is closed (retracted inward; backpack form), each of the wheels cover 46 becomes rotated outward so as to cover the wheel tire and allow for a clean interphase between backpack 100 and the user's garment.

Telescopic handle 30 ends, on its upper portion, with a grip 32 having a release button 36 that upon pressing on it, the user can either pull the telescopic handle upward to extract it to its maximal size, or push it downward to retract it to its minimal size. Handle grip 32 is positioned within a cradle 38 that is connected to the telescopic handle and also configured to be connected to the backpack fabric. Back plate 382 of the telescopic handle grip cradle 38, is shown in FIG. 2A, while the front side of cradle 38 with bottom area 381, is shown in FIG. 2B. In this view (2B), at the bottom area 381 of telescopic handle grip cradle 38, a shoulder straps top anchoring assembly 50 is positioned.

Top anchoring assembly 50 is configured to be connected to one or more elastic webbing straps and also to be mounted onto the telescopic handle of the trolley case in a manner such that upon extraction of the telescopic handle upward, top anchoring assembly 50 becomes elevated with it, and consequently, it pulls up the one or more elastic webbing strap 34 that is/are connected to it. The connection of the one or more elastic webbing straps to the top anchoring assembly may be performed in various connection means. For example, it may be threaded through it, double threaded through it, tied to it and the like. In the specific example illustrated in these figures, top anchoring assembly 50 is composed of three main components; a top connector 51, a top connector mount 52, and a top connector release button 53. A close-up isometric view and a cross section view of this area are shown in FIGS. 3A-3B and will be described in details below. It should be clear that the shoulder straps retraction mechanism is only an optional feature and convertible backpack 100 may or may not include it.

In the isometric front view (FIG. 2A), a wheel shaft 48 and a wheel crankshaft mechanism cover 69 are shown. Detailed description of the wheel crankshaft mechanism that is responsible to rotate the wheels covers 46 according to the usage form of the convertible backpack 100 is provided with reference to FIGS. 3-4.

In the back view and side view illustrations shown in FIGS. 2C, 2D respectively, convertible backpack frame 110 is shown in a backpack form, i.e. telescopic handle 30 is retracted inward to its minimal size and wheel covers 46 are at their outmost position relative to the trolley base 14, covering the wheels' tires.

FIG. 3A-3B are schematic close-up illustrations of the handle grip area of FIG. 2B that includes the telescopic handle grip 32, the grip cradle 38, the top portion of telescopic handle 30, and the shoulder straps top anchoring assembly 50. FIG. 3A is an isometric view of the handle grip area and FIG. 3B is a cross section view along axis A-A of the handle grip area of FIG. 3A.

As mentioned above, telescopic trolley handle 30 ends on its upper part in a grip area 32 having a release button 36 that upon pressing on it, the user can either pull up the telescopic handle to extract it to its maximal size, or push it downward to retract it to its minimal size. Handle grip 36 is positioned within cradle 38. In a retracted position, the shoulder straps top anchoring connection assembly 50 is positioned adjacent to bottom surface 381 of cradle 38. The top anchoring connector 50 is composed of, in the specific example illustrated in these figures, three main components; a top connector 51, a top connector mount 52, and a top connector release button 53 that is connected to spring 54. Shoulder straps 20 are connected to the back side of backpack 100 at their upper part and further connected by adjustment straps 26 through a release buckle 18 to trolley base 14.

In the specific non-limiting example illustrated in these figures, a single elastic webbing strap 34 is fixed on the upper part of each one of the shoulder straps, and threaded through the shoulder straps top connector 51 that is fixed to mount 52 by a mechanical clicking mechanism. More specifically, protrusions 58 are configured to be clicked into holes 57 on mount 52 to thereby attach top connector 51 to top connector mount 52. It should be clear that other attachment means are possible, that a person skilled in the art may use for connecting top connector 51 to mount 52, and should be considered to be within the scope of the present invention. Connector 51 comprises at its outer side holes 59 for threading the elastic webbing strap through them. Other attachment means may also be applicable for connecting the elastic webbing strap to top anchoring connector 50 and the above example should not be construed as a limiting example.

When the telescopic handle 30 is in a close retracted position (backpack form), shoulder straps 20 are in the lower position which allows the user to strap the backpack on his back. Once the telescopic handle is in the fully open position, top connector 51 that is fixed into top connector mount 52 is pulled upward with the telescopic trolley handle, and the elastic zigzag webbing 34, which is threaded through the top connector 51, pulls the shoulder straps upward respectively, to elevate them from the ground. As a result, when the user is rolling the trolley case, the shoulder straps 20 are kept away from the ground and remain clean and unfrayed. When the telescopic handle is pushed downward to the close position and the length of the handle is shortened, the elastic zigzag webbing retracts automatically to its minimal size.

In some optional embodiments of the invention, top anchoring connector 50 may be partially removed from the convertible backpack if the user wishes to use the convertible backpack only as a trolley for a certain length of time, and to be re-assembled to the backpack when intending to use the convertible backpack 100 in both of its forms. In such scenario, upon pressing on top connector release button 53, top connector 51 is detached from assembly 50, thereby releasing the upper area of the shoulder straps that is connected to the telescopic trolley handle. Upon release of the adjustment straps 26 from buckles 18, the bottom ends of the shoulder straps also become released, and the user can now fold the shoulder straps and insert them into a dedicated pocket 122 on the back side of the backpack. Pocket 122 may be closed by a zipper 123 or by other means such as Velcro. If the user wants to re-use the convertible backpack as a backpack, he/she takes the straps with the connecting elements out of pocket 122 and reconnects them.

Reference is now made to FIGS. 3A-3B and 4A-4C.

FIGS. 3A and 4A are schematic cross section side view illustrations of convertible backpack frame 110 of FIG. 2D, showing the structure and position of the components involved in the rotatable cover wheel mechanism when the telescopic handle is closed (backpack form), and when the telescopic handle is open (trolley case form) respectively; FIGS. 3B and 4B are close-up views of areas 70 and 72 of FIGS. 3A and 4A respectively, showing major components of the wheel cover extraction and retraction mechanism 60 (also denoted herein below interchangeably as "wheel crankshaft mechanism"). FIG. 4C is a schematic isometric partial close-up view of the main components of the wheel crankshaft mechanism shown in FIG. 4B, wherein the wheel shaft mechanism cover 69 is partially removed for clarity purposes.

In the specific non-limiting example illustrated in these figures, telescopic trolley handle 30 is a three-stage handle, wherein each two adjacent parts are connected by a connector 31. When the three-stage telescopic handle is in a closed (retracted) position, each one of the wheel covers 46 is rotated by the wheels' shaft 48 fully outward relative to trolley base 14. The rotating motion of the wheels' shaft is produced as a result of the pressure exerted by a crankshaft top pressure slider 64 positioned at the lowest part of telescopic handle 30, on the top part of crank 62. More specifically, when the crankshaft top pressure slider 64 strokes crank 62, wheels' shaft 48 is fully rotated and the wheel covers 46 change position to the most outward position i.e. covering the wheels, since the convertible backpack is now in a backpack form.

Once the three-stage telescopic handle 30 is in an open position, the wheel covers 46 are retracted by the force of two retraction springs 49 that are mounted on wheels' shaft 48 back into trolley base 14 to their inmost position. More particularly, when crankshaft top pressure slider 64 is pulled upward, the pressure on the top of crank 62 is released and as a result, the wheel covers 46 are rotated by the wheel's shaft 48 and retracts back into the trolley base 14. The rotation motion of the wheels' shaft 48 is produced as a result of the release of the pressure of the top part of the crank 62 by crankshaft top pressure slider 64. With the aid of the force of the two (or more) retraction springs 49, the shaft 48 is rotated and crank 62 is moved correspondingly to a retraction position. Also shown in these figures are: telescopic handle 30, telescopic handle grip 32, telescopic handle release button 36, release button spring 36', and top anchoring connector assembly 50.

It should be clear that the description of the embodiments and attached Figures set forth in this specification serves only for a better understanding of the invention, without limiting its scope. It should also be clear that a person skilled in the art, after reading the present specification could make adjustments or amendments to the attached Figures and above described embodiments that would still be covered by the present invention.

The invention claimed is:

1. A convertible backpack configured be converted from a backpack position into a trolley case, and vice versa according to a user preference, said convertible backpack comprising at least:
   a. a trolley base configured to hold a backpack and to be connected to a handle and to at least two wheels for rolling the trolley case on the ground;
   b. a telescopic trolley handle configured to be extracted upward upon usage of the convertible backpack as a trolley case, and to be retracted inward upon usage as a backpack;
   c. at least two wheels configured to allow rolling of the trolley case on the ground;
   d. a backpack body configured to be assembled with said trolley base and said telescopic trolley handle; and
   e. a rotatable wheels cover mechanism for covering the outer side of each one of said wheels upon usage of said convertible backpack as a backpack and for uncovering the outer side of each one of said wheels upon usage of said convertible backpack as a trolley case.

2. A convertible backpack according to claim 1, wherein said rotatable wheels cover mechanism is operated by movement of said telescopic trolley handle upward and downward such that upon extraction of said telescopic trolley handle upward, each of said wheel covers rotates inward so as to uncover the outer side of said wheels, and upon insertion of said telescopic trolley handle downward, each of said wheel covers rotates outward so as to cover the outer side of said wheels.

3. A convertible backpack according to claim 1, wherein said rotatable wheels cover mechanism comprises at least:
   a. a crankshaft top pressure slider positioned at the lowest part of said telescopic trolley handle;
   b. a crank;
   c. a wheel shaft for connecting said wheels of said convertible backpack; and
   d. at least two retraction springs mounted on said wheel shaft;
   wherein, upon insertion of said telescopic trolley handle downward, each of said wheel covers is rotated by said wheel shaft outward by pressure produced by said crankshaft top pressure slider on said crank so as to cover said outer sides of the wheels, and upon extraction of said telescopic trolley handle upward, said crankshaft top pressure slider is pulled up, releasing the pressure on said crank, thereby allowing the wheel shaft to rotate inward with the aid of the force applied by said at least two retraction springs together with said wheel covers so as to uncover the outer sides of said wheels.

4. A convertible backpack according to claim 1, further comprising shoulder straps and a shoulder straps retraction mechanism, wherein upon extraction of the telescopic trolley handle upward for usage of said convertible backpack as a trolley case, said shoulder straps retraction mechanism is configured to pull the shoulder straps upward along said telescopic trolley handle, for elevating said shoulder straps away from the ground, and further to bring said shoulder straps back to their initial position, upon retraction of said telescopic trolley handle inward to a backpack position.

5. A rotatable wheel cover mechanism for a convertible backpack that can be converted from a backpack into a trolley case, and vice versa, according to a user's preference comprises at least:
   a. a crankshaft top pressure slider positioned at the lowest part of a telescopic trolley handle;
   b. a crank;
   c. a wheel shaft for connecting the wheels of said convertible backpack;
   d. wheel covers for covering the wheels of said convertible backpack, and
   e. at least two retraction springs mounted on said wheel shaft;
   wherein, upon usage of said convertible backpack as a backpack and insertion of said telescopic trolley handle downward, each of said wheels covers is rotated by said wheel shaft outward by pressure produced by said crankshaft top pressure slider on said crank, so as to cover the outer sides of said wheels, and upon extraction of said telescopic trolley handle upward to use said convertible backpack as a trolley case, said crankshaft top pressure slider is pulled up, and the pressure on said crank is released, allowing said wheel shaft, with the aid of the force applied by said at least two retraction springs, to rotate inward, together with said wheels covers, so as to uncover the outer sides of said wheels.

* * * * *